(12) United States Patent
Numata et al.

(10) Patent No.: US 7,604,890 B2
(45) Date of Patent: Oct. 20, 2009

(54) FUEL CELL DISCHARGE-GAS PROCESSING DEVICE

(75) Inventors: Hideo Numata, Utsunomiya (JP); Akio Yamamoto, Utsunomiya (JP); Masahiro Matsutani, Utsunomiya (JP); Shujiro Nozaki, Utsunomiya (JP); Shinri Hayashi, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/408,392

(22) Filed: Apr. 21, 2006

(65) Prior Publication Data
US 2006/0254906 A1 Nov. 16, 2006

(30) Foreign Application Priority Data
May 13, 2005 (JP) ............................ 2005-141702

(51) Int. Cl.
*H01M 2/02* (2006.01)
(52) U.S. Cl. ........................................ 429/34; 204/258
(58) Field of Classification Search .................. 429/12, 429/13, 17, 22, 34; 204/258
See application file for complete search history.

(56) References Cited

U.S. PATENT DOCUMENTS

| 6,395,414 B1* | 5/2002 | Clingerman et al. ........... 429/17 |
| 2005/0130000 A1* | 6/2005 | Ojima et al. ................... 492/22 |
| 2006/0040158 A1* | 2/2006 | Numata et al. ................. 429/34 |

FOREIGN PATENT DOCUMENTS

| JP | 2002-289237 | * 10/2002 |
| JP | 2004-006183 | 1/2004 |

* cited by examiner

*Primary Examiner*—Patrick Ryan
*Assistant Examiner*—Monique Wills
(74) *Attorney, Agent, or Firm*—Lahive & Cockfield, LLP; Anthony A. Laurentano

(57) ABSTRACT

A fuel cell discharge-gas processing device includes: an anode off-gas introduction path which introduces an anode off-gas discharged from an anode of a fuel cell; a dilution container which is connected to the anode off-gas introduction path, and into which the anode off-gas is introduced; and a bypass path which branches off from a cathode gas supply path for supplying a cathode gas to a cathode of the fuel cell, and is connected to the dilution container so as to bypass the fuel cell. While the fuel cell is in operation, the cathode gas supplied from the bypass path into the dilution container is discharged to an exterior of the dilution container.

3 Claims, 4 Drawing Sheets

FUEL CELL DISCHARGE-GAS PROCESSING DEVICE

BACKGROUND OF THE INVENTION

Priority is claimed on Japanese Patent Application No. 2005-141702, filed May 13, 2005, the contents of which are incorporated herein by reference.

FIELD OF THE INVENTION

The present invention relates to a discharge-gas processing device that performs dilution processing of off-gas discharged from a fuel cell.

DESCRIPTION OF THE RELATED ART

As a type of fuel cell to be installed in a fuel cell vehicle and the like, a fuel cell is known in which electrical power is generated through chemical reactions of reactant gases. Among such fuel cells, a type of fuel cell is known that provides an anode and a cathode on opposite sides of a solid polymer electrolyte membrane, supplies a fuel gas (e.g., hydrogen gas) to the anode and supplies an oxidizing gas (e.g., air containing oxygen) to the cathode so that chemical energy produced in an oxidation reduction reaction of these reactant gases is directly extracted as electrical energy.

In this type of fuel cell, water is produced at the cathode side by the power generation, and a portion of the produced water permeates the solid polymer electrolyte membrane so as to diffuse into the anode area. In addition, a trace quantity of nitrogen contained in air supplied to the cathode permeates the solid polymer electrolyte membrane so as to diffuse into the anode side, where it mixes with the hydrogen gas. The power generation in the fuel cell may become unstable due to impurities such as the water and nitrogen on the anode side.

In particular, in a circulation-type fuel cell system in which an unreacted hydrogen gas (anode off-gas) that is discharged from the fuel cell is recycled and supplied to the fuel cell again after being mixed with fresh hydrogen gas in order to increase fuel efficiency, the concentration of the above-mentioned impurities at the anode side tends to gradually increase.

In order to solve such a problem in this type of circulation-type fuel cell system, the concentration of the impurities contained in the anode off-gas is reduced by periodically opening an exhaust valve to discharge anode off-gas containing the impurities from the anode off-gas circulation path in which the anode off-gas circulates.

When the anode off-gas discharged from the anode off-gas circulation path is to be discharged to outside (the atmosphere), a discharge-gas processing device dilutes the anode off-gas with a diluent gas (e.g., air as the cathode off-gas that is discharged from the cathode) to reduce the hydrogen concentration and then discharges it.

Japanese Unexamined Patent Application, First Publication No. 2002-289237 discloses an example of a conventional discharge-gas processing device. In this discharge-gas processing device, cathode gas is branched to be introduced into a dilution container, dilute anode off-gas little by little, and discharge it little by little to the exterior of a vehicle.

Japanese Unexamined Patent Application, First Publication No. 2004-6183 proposes a technology for providing a suppressing device for suppressing an outflow of the anode off-gas within a container.

In the circulation-type fuel cell system, the anode off-gas is discharged intermittently while the cathode off-gas is discharged continuously. Therefore, in the case in which the cathode off-gas is utilized as the diluent gas, as conventionally, there is a possibility in which the anode off-gas introduced into an upstream side of the discharge-gas processing device takes short cut to cathode off-gas introduction path from the upstream side of the discharge-gas processing device. As a result, there is a possibility in which the discharge-gas processing device cannot provide the diluent performance efficiently.

In addition, since the cathode off-gas contains produced water, there is a possibility in which a pipe for introducing the cathode off-gas into the discharge-gas processing device is closed by the condensation of the produced water, and thereby lowering the supply amount of the cathode off-gas. In addition, in a further low temperature environment, the condensed produced water freezes, and thereby shutting of the pipe.

Furthermore, in a technology as same as that disclosed in Japanese Unexamined Patent Application, First Publication No. 2002-289237,since a pressure-loss portion needs to be provided in order to introduce the diluent gas needs to be determined considering the pressure loss of the cathode off-gas. As a result, there are problems in that a load required for the compressor increases; and thereby, increasing the size of the compressor, increasing the cost, losing layout flexibility, and shortening the life of the compressor.

The present invention has an object of providing a discharge-gas processing device which can increase the reliability by securing diluent performance while in a low temperature environment, and which can decrease the load on devices for supplying diluen gas.

SUMMARY OF THE INVENTION

In order to achieve the above-mentioned object, the present invention adopts a fuel cell discharge-gas processing device including: an anode off-gas introduction path which introduces an anode off-gas discharged from an anode of a fuel cell; a dilution container which is connected to the anode off-gas introduction path, and into which the anode off-gas is introduced; and a bypass path which branches off from a cathode gas supply path for supplying a cathode gas to a cathode of the fuel cell, and is connected to the dilution container so as to bypass the fuel cell. While the fuel cell is in operation. the cathode gas supplied from the bypass path into the dilution container is discharged to an exterior of the dilution container.

According to the fuel cell discharge-gas processing device, the cathode gas supplied during the operation of the fuel cell, will be directly provided as diluent gas to the dilution container through the bypass path without passing through the fuel cell. Thus, pressure loss caused by passing through the fuel cell will not occur; therefore, the cathode gas can be introduced into the dilution container while maintaining higher pressure than that of the anode off-gas.

Accordingly, in the case in which the anode off-gas is supplied intermittently in the circulation-type fuel cell system, it becomes possible to prevent: back flow of the anode off-gas through the bypass path; and suppressing an incoming of the cathode off-gas through the bypass path. Therefore, it becomes possible to make the anode off-gas and the cathode off-gas flow into their predetermined paths within the dilution container. In addition, since the cathode off-gas can be maintained in higher pressure than the anode off-gas, mixing between the cathode off-gas and the anode off-gas can be accelerated by diffusion of the cathode gas, while mixing the cathode off-gas and the anode off-gas in the dilution container. Furthermore, since the cathode off-gas does not contain produced water which is produced during power generation of the fuel cell, and since the back flow of the anode off-gas can be suppressed as mentioned in the above, it becomes possible to prevent clogging of the bypass path due to condensing water inside the bypass path or freezing water inside the bypass path in a low-temperature environment.

Furthermore, a path for the cathode off-gas does not include a portion which may be the cause of the pressure loss. Thus, since the cathode off-gas can be introduced from the upstream side (high pressure side) of the fuel cell to the downstream side (low pressure side) of the fuel cell by the pressure difference therebetween, it becomes possible to decrease the load on devices for supplying the cathode gas being the diluent gas.

Accordingly, it becomes possible to increase the reliability by securing diluent performance while in a low temperature environment, and decrease the load on devices for supplying cathode gas being diluent gas.

The fuel cell discharge-gas processing device may further include a venting gas supply path which supplies a cathode gas for venting from an upstream side of the fuel cell to the dilution container. The venting gas supply path may include: a branching portion which branches off from the bypass path and has an inner diameter larger than an inner diameter of the bypass path; and a valve provided on the branching portion.

In this case, the cathode gas flowing through the branching portion having comparatively larger inner diameter can be supplied into the dilution container in a large flow rate, and the cathode gas flowing through the bypass path having comparatively smaller inner diameter can be supplied into the dilution container in a high pressure condition so as to efficiently mix with the anode off-gas and thereby diluting the anode off-gas. Accordingly, each of dilution process and venting process can be performed efficiently. Furthermore, since the bypass path has a smaller diameter than that of the branching portion, it becomes easy to control the flow rate of the cathode gas necessary for the dilution during the operation of the fuel cell.

A flow rate controlling device may be provided on the bypass path.

In this case, the flow rate of the cathode gas for diluent can be easily controlled by using the flow rate controlling device.

DETAILED DESCRIPTION OF THE INVENTION

An embodiment of the fuel cell discharge-gas processing device of the present invention will be explained hereinbelow referring to FIG. 1 to FIG. 4.

Figure 1:
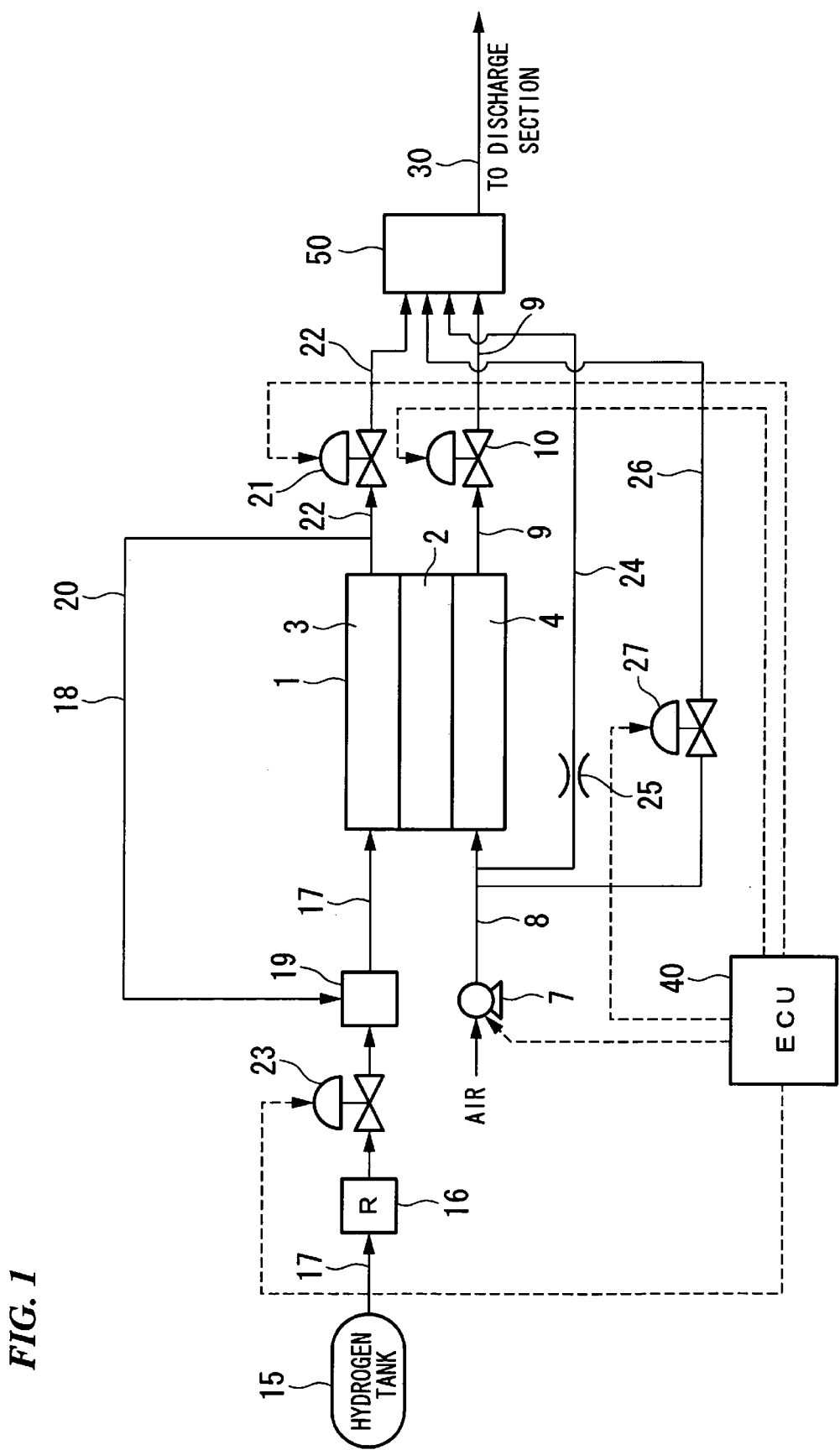
FIG. 1 is a schematic diagram showing an embodiment of a fuel cell system equipped with a discharge-gas processing device of the present invention.

FIG. 1 is a schematic lineblock diagram of a fuel cell system equipped with the discharge-gas processing device according to the present invention, which in this embodiment is mounted in a fuel cell vehicle.

A fuel cell 1 is of the type that obtains electrical power through chemical reactions of reactant gases. The fuel cell 1 is constituted by, for example, laminating a plurality of cells formed by sandwiching a solid polymer electrolyte membrane 2 including a solid polymer ion exchange membrane etc. between an anode 3 and a cathode 4 (shown by the single cell in FIG. 1). When hydrogen gas (reactant gas) is supplied to the anode 3 as a fuel gas, and air containing oxygen (reactant gas) is supplied to the cathode 4 as an oxidizing agent gas, hydrogen ions generated by a catalytic reaction in the anode 3 pass the solid polymer electrolyte membrane 2 and travel to the cathode 4, where electricity is generated by the electrochemical reaction with the oxygen and water is produced. Since a portion of the produced water generated at the cathode side penetrates the solid polymer electrolyte membrane 2 and back diffuses to the anode side, produced water also exists at the anode side.

Air is pressurized to a prescribed pressure by a compressor 7, such as a supercharger (S/C), and is supplied to the cathode 4 of the fuel cell 1 through an air supply path 8. After the air supplied to the fuel cell 1 is used for electricity generation, the air is discharged, along with the produced water of the cathode side, from the fuel cell 1 to an air exhaust path 9, introduced into the discharge-gas processing device 50 through a pressure control valve 10, and thereafter discharged to the exterior of the system. Pressure of the air is controlled to a predetermined pressure by adjusting an opening degree of the pressure control valve 10.

The hydrogen gas supplied from a hydrogen tank 15 flows through a hydrogen gas supply path 17, is decompressed to a prescribed pressure along the way by a regulator 16, controlled to a prescribed flow rate by a flow control valve 23, and supplied to the anode 3 of the fuel cell 1 through an ejector 19. The unreacted hydrogen gas which was not consumed is discharged as anode off-gas from the fuel cell 1, sucked by the ejector 19 through an anode off-gas path 18, merged with the fresh hydrogen gas supplied from the hydrogen tank 15 and supplied again to the anode 3 of the fuel cell 1. To wit, the anode off-gas discharged from the fuel cell 1 circulates through the fuel cell 1, passing the anode off-gas path 18 and the hydrogen gas supply path 17 downstream of the ejector 19. In the present embodiment, the hydrogen gas supply path 17 downstream of the ejector 19 and the anode off-gas path 18 constitute a fuel gas circulation path 20.

An anode off-gas exhaust path 22 equipped with an exhaust valve 21 branches off from the anode off-gas path 18, and the anode off-gas exhaust path 22 is connected to the discharge-gas processing device 50. In the air supply path 8, a dilution flow path 24 branches off from the downstream side of the compressor 7 so as to bypass the fuel cell 1, and is connected to the discharge-gas processing device 50. In the discharge-gas processing device 50, the anode off-gas discharged from the anode off-gas exhaust path 22 is pressurized by the cathode gas supplied from the dilution flow path 24 while partially merged with and diluted by the cathode gas, and is thereafter discharged through a mixed gas discharging path 30 to the exterior of the system.

In addition, a venting flow path 26 branches off from the dilution flow path 24 so as to supply the cathode gas for venting the anode gas within the discharge-gas processing device 50. The venting flow path 26 branching off from the dilution flow path 24 has a larger internal diameter than that of the dilution flow path 24, and has an open-and-close valve (a venting valve) 27 provided thereon which is opened and closed in accordance with the timing of a venting process.

In addition, the dilution flow path 24 has an orifice 25 at a portion other than the venting flow path 26, and the orifice 25 regulates the flow rate of the cathode gas flowing through the dilution flow path 24.

Electric power obtained by power generation of the fuel cell 1 is supplied to a load such as a motor for driving a vehicle (not illustrated).

Moreover, an electronic control unit (hereafter, ECU) 40 controls: the rotation frequency of the compressor 7; opening degrees of the pressure control valve 10 and the flow control valve 23; and opening and closing of the exhaust valve 21 and the gas venting valve (the open-and-close valve) 27.

In the fuel cell system, as mentioned above, power generation of the fuel cell 1 may become unstable during continuous operation due to an increased concentration of impurities (such as water and nitrogen) in the hydrogen gas flowing though the fuel gas circuit 20.

Therefore, when it is judged by the ECU 40 in this fuel cell system that the fuel cell system has been in continuous operation for a definite period of time, or when it is judged that the stability of power generation of the fuel cell 1 has dropped, determining there is a demand to discharge impurities, it opens the exhaust valve 21, intermittently discharges anode off-gas containing the impurities from the anode off-gas path 18 to the discharge-gas processing device 50 through the anode off-gas exhaust path 22, and controls the impurity concentration in the hydrogen gas which flows through the anode 3 of the fuel cell 1 to not exceed a predetermined value, and so maintains power generation of the fuel cell 1 in a stabilized state.

Figure 2:
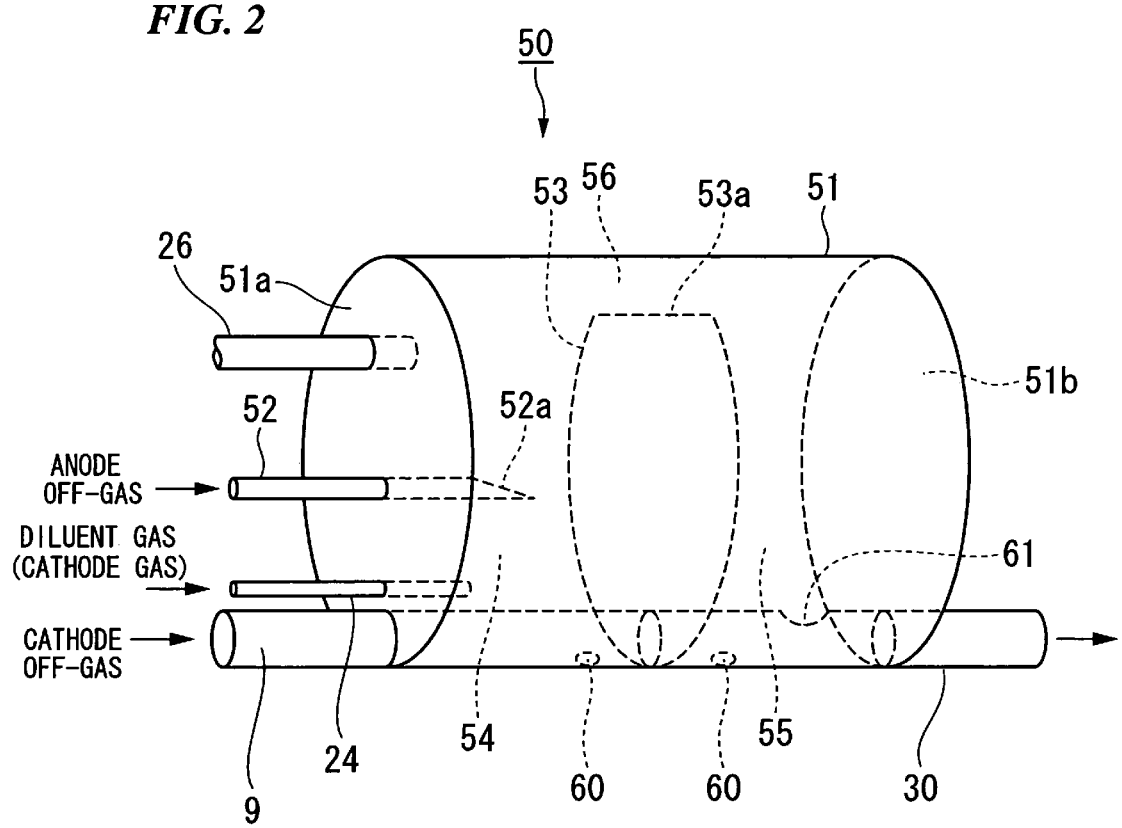
FIG. 2 is a perspective view of the discharge-gas processing device of the same embodiment.

Next, the structure of the discharge-gas processing device 50 will be explained in detail referring to FIG. 2 and FIG. 3. The discharge-gas processing device 50 is equipped with an airtight cylindrical dilution container 51. The dilution container 51 is provided in a vehicle with its axial center oriented in a substantially horizontal direction, with its cross-sectional shape perpendicular to the axial center direction forming an identical elliptical shape along the full length in the axial direction, and the long axis of this ellipse arranged in the vertical direction.

In other words, the axial center of the dilution container 51 is set in a substantially horizontal orientation, and its cross-sectional shape perpendicular to the axial center is composed of a curve forming a convex curve shape on the outside along the perimeter of the closed cross section.

An anode off-gas introduction pipe (anode off-gas introduction path) 52 arranged horizontally with its axial center slightly lower than the axial center of the dilution container 51 is passed through and fixed to an end plate 51*a* of one end side of the dilution container 51 in the axial direction. The distal end of the anode off-gas introduction pipe 52 inserted into the dilution container 51 is cut obliquely to be made into an anode off-gas emission hole 52*a*. The opening of the anode off-gas emission hole 52*a* is oriented obliquely upward. The anode off-gas exhaust path 22 is connected to the proximal end of the anode off-gas introduction pipe 52, so that when the exhaust valve 21 opens, anode off-gas is introduced into the dilution container 51 from the anode off-gas emission hole 52*a*.

Moreover, in the inside of the dilution container 51, a partition panel 53 is fixed forward of the distal end of the anode off-gas introduction pipe 52, in substantially the middle of the dilution container 51 in the axial direction, with a substantially vertical orientation. The partition panel 53 forms the shape of an ellipse with its upper portion cut away, and is closely fixed to the inner surface of the dilution container 51 except for a notch portion 53*a*. The inside of the dilution container 51 is divided by the partition panel 53 into an upstream chamber 54 communicating with the anode off-gas introduction pipe 52, and a downstream chamber 55 communicating with a mixed gas discharge hole 61 described hereinbelow, with the side above the notch portion 53*a* forming a communication gas path 56 that communicates with the upstream chamber 54 and the downstream chamber 55.

The notch portion 53*a* of the partition panel 53 is positioned sufficiently above the axial center of the dilution container 51; and therefore the partition panel 53 exists on the axial extension of the anode off-gas introduction pipe 52. Accordingly, as shown in FIG. 3, most of the anode off-gas emitted from the anode off-gas emission hole 52*a* is emitted toward the partition panel 53, while a portion of the anode off-gas is emitted obliquely upward from the anode off-gas emission hole 52*a*.

Moreover, the air exhaust path 9 is provided along the lowest portion (an inner bottom portion) of an inner surface of the dilution container 51 so as to penetrate the dilution container 51 from the end plate 51*a* on one end side to the end plate 51*b* on the another end side along the axial center direction. The air exhaust path 9 also penetrates the partition panel 53. The air exhaust path 9 is provided in the dilution container 51 so as to be isolated from an inside of the dilution container 51 except for the mixed gas discharge hole 61 and a drain hole 60 each formed on the end plate 51*b* side (i.e. on the another end side). By adopting this configuration, the anode off-gas introduced into the dilution container 51 can be prevented from merging with a flow within the air exhaust path 9 at the upstream side within the dilution container 51 (i.e., on the plate end 51*a* side, and on the one end side). The anode off-gas is discharged from the mixed gas discharge hole 61 to the exterior through the mixed gas discharging path 30.

Furthermore, a plurality of drain holes 60 are provided at portions of the air exhaust path 9, each accommodated in the upstream chamber 54 and the downstream chamber 55. Produced water accumulated in the dilution container 51 is discharged from these drain holes 60 to the exterior through the air exhaust path 9.

In addition, the mixed gas discharge hole 61 is provided at a portion of the air exhaust path 9 where is accommodated in the downstream chamber 55, and is near the end plate 51*b* on the downstream side than the drain holes 60. At the downstream side of the dilution container 51, the gas inside the downstream chamber 55 is introduced into the air exhaust path 9 through the mixed gas discharge hole 61, and is thereafter exhausted to the exterior through the mixed gas discharging path 30.

Next, the operation of the discharge-gas processing device 50 will be explained.

In this discharge-gas processing device, always while supplying air from the compressor 7 to the cathode 4 of the fuel cell 1, the air is introduced into the discharge-gas processing device 50 through the dilution flow path 24. At this time, the gas venting valve 27 is closed, and therefore the communication through the venting flow path 26 is blocked.

On the other hand, as mentioned above, when the ECU 40 judges there to be a demand to discharge impurities, the exhaust valve 21 opens, anode off-gas is discharged from the anode off-gas path 18, introduced into the anode off-gas introduction pipe 52 of the discharge-gas processing device 50 through the anode off-gas exhaust path 22, and emitted from the anode off-gas emission hole 52*a* into the upstream chamber 54.

Accordingly, when anode off-gas is not emitted from the anode off-gas emission hole 52*a* to the upstream chamber 54, (to wit, when the exhaust valve 21 is closed), the pressure in the dilution container 51 hardly rises. However, when the exhaust valve 21 is open and anode off-gas is emitted from the anode off-gas emission hole 52*a* to the upstream chamber 54, the internal pressure of the dilution container 51 suddenly rises. That is, a pressure change occurs in the dilution container 51 according to the discharge cycle of the anode off-gas.

In the present embodiment, the cathode gas supplied during the operation of the fuel cell 1 is directly supplied as the diluent gas to the dilution container 51 through the dilution flow path 24, without passing through the fuel cell 1. Therefore, the cathode gas can be introduced into the dilution container 51 without having pressure loss due to passing through the fuel cell 1, while maintaining the relatively higher pressure state with respect to the anode off-gas. Accordingly, it becomes possible to prevent: the anode off-gas introduced into the dilution container 51 from causing reverse flow through the dilution flow path 24; and suppressing the cathode gas flowing from the dilution flow path 24 into the dilution container 51. Thus, the anode off-gas and cathode gas can flow through their predetermined flow paths within the dilution container 51. Furthermore, since the cathode gas has relatively higher pressure with respect to the anode off-gas, mixing and diluting of the cathode gas and the anode off-gas can be promoted by the diffusion of the cathode gas when mixing them in the dilution container 51.

The dilution container 51 of the present embodiment has a cross-sectional shape perpendicular to the axial center direction that consists of a curve (ellipse) forming a convex curve shape on the outside along the perimeter of the closed cross section. Therefore, the dilution container 51 has extremely high mechanical strength (pressure capacity) against internal pressure and deformation-(repetitive stress) due to breathing of the dilution container 51, which can be sufficiently withstood without a special reinforcing structure. Since a special reinforcing structure is unnecessary, the discharge-gas processing device 50 can be easily manufactured.

Figure 3:
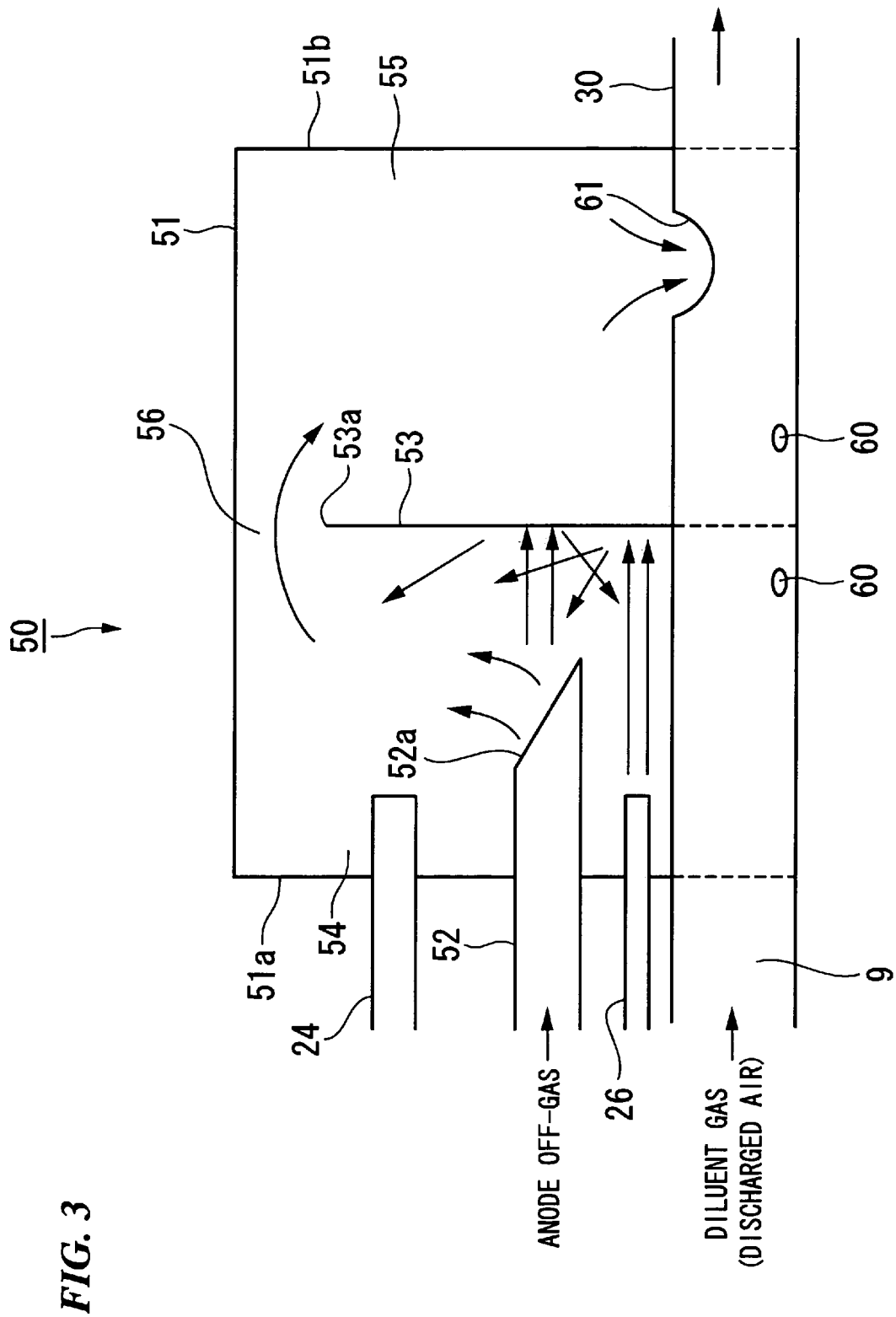
FIG. 3 is a cross-sectional view of the same discharge-gas processing device.

As shown in FIG. 3, the anode off-gas emitted from the anode off-gas emission hole 52a collides with the partition panel 53, altering its flow direction, and the collision with the partition panel 53 reduces its flow speed so that it spreads mostly throughout the inside of the upstream chamber 54 at a moderate flow speed. Thereby, while being partially mixed with the discharged air in the upstream chamber 54, the anode off-gas flows into the downstream chamber 55 through the communication gas path 56 and flows toward the mixed gas discharge hole 61. In the meantime, blending is further performed between the mixed gas flowing from the upstream chamber 54 and the gas in the downstream chamber 55. Then, the gas in the downstream chamber 55 is discharged from the mixed gas discharge hole 61 to the air exhaust path 9 to be further diluted by being mixed with discharged air flowing through the air exhaust path 9 before being discharged from the mixed gas discharging path 30 to the exterior of the fuel cell system.

In the present embodiment, the travel distance of the gas within the dilution container 51 can be lengthened by providing the partition panel 53. Furthermore, the travel distance of the gas in the dilution container 51 can also be lengthened even by disposing the mixed gas discharge hole 61 in the vicinity of the end portion on the downstream side in the axial direction of the dilution container 51. As a result, since the stagnation time of the gas in the dilution container 51 can be prolonged to be able to ensure sufficient time necessary for dilution, the anode off-gas can be reliably diluted and discharged.

In addition, as stated above, since the reverse flow of the anode off-gas towards the dilution flow path 24 can be suppressed, it becomes possible to prevent: shutting off of the dilution flow path 24 due to water condensed in the dilution flow path 24; or freezing of the water in the dilution flow path 24 when in the low temperature environment. Furthermore, since the dilution flow path 24 does not have a portion that may be the cause of pressure loss, the load on the compressor 7 for supplying the cathode gas can be reduced.

In addition, in the present embodiment, since each of the mixed gas discharge hole 61 and the drain holes 60 is directly provided on the air exhaust path 9, the discharge-gas processing device 50 can have simple configuration.

ANOTHER EMBODIMENT

The present invention is not limited to the aforementioned embodiment.

Figure 4:
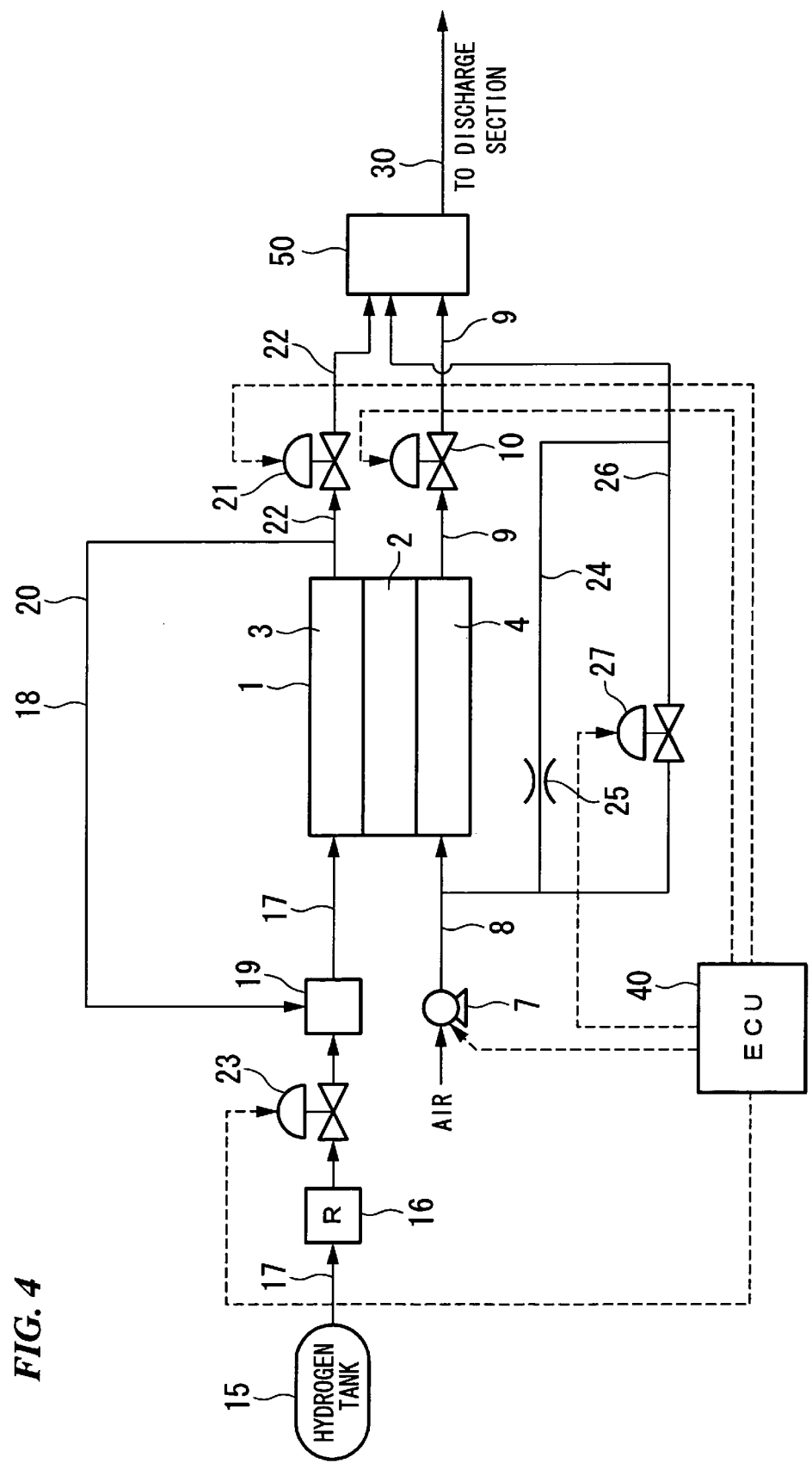
FIG. 4 is a schematic diagram showing a variant example of a fuel cell system shown in FIG. 1.

For example, in the aforementioned embodiment, the venting flow path 26 and the dilution flow path 24 are provided independently from each other; however, as shown in FIG. 4, a portion of the venting flow path 26 and a portion of the dilution flow path 24 may be combined together. In this case, as shown in FIG. 4, it is preferable to provide the orifice 25 or the open-and-close valve 27 at portions where are independent from each other in the point in that each of the processes can be efficiently performed while performing the venting process and the dilution process.

In addition, in the aforementioned embodiment, the cross section of the dilution container 51 was made elliptical, but it is also possible to be circular.

Moreover, it is also possible not to provide the diluent gas emission hole, the mixed gas discharge hole, and the drain holes in the diluent gas path directly, but to provide these holes in branch pipes that branch off from the diluent gas path.

Moreover, in the present embodiment, although there was only one partition panel, there may be a plurality, for example, alternately arranged. In this case, among the plurality of partition panels, some of the partition panels form an upstream chamber and a downstream chamber, with places that communicate with the upstream chamber and the downstream chamber forming communication gas paths.

Furthermore, in the aforementioned embodiment, although the partition panel is provided in the dilution container, this invention can be achieved without the partition panel.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell discharge-gas processing device comprising:
   an anode off-gas introduction path which introduces an anode off-gas discharged from an anode of a fuel cell;
   a dilution container which is connected to the anode off-gas introduction path, and into which the anode off-gas is introduced; and
   a bypass path which branches off from a cathode gas supply path for supplying a cathode gas to a cathode of the fuel cell, and is connected to the dilution container so as to bypass the fuel cell, wherein
   while the fuel cell is in operation, the cathode gas supplied from the bypass path into the dilution container is discharged to an exterior of the dilution container, wherein
   the fuel cell discharge-gas processing device further comprises a venting gas supply path which supplies the cathode gas for venting from an upstream side of the fuel cell to the dilution container, and wherein
   the venting gas supply path includes:
     a branching portion which branches off from the bypass path and has an inner diameter larger than an inner diameter of the bypass path; and
     a valve provided on the branching portion.

2. The fuel cell discharge-gas processing device according to claim 1, wherein
a flow rate controlling device is provided on the bypass path.

3. The fuel cell discharge-gas processing device according to claim 1, further comprising:
a cathode off-gas discharge path which discharges a cathode off-gas from the cathode, penetrates through the dilution container, and includes a diluted gas discharge hole formed therein at a position inside the dilution container, wherein
the anode off-gas introduced through the anode off-gas introduction path into the dilution container is diluted by the cathode gas supplied from the bypass path, and is discharged to the exterior of the dilution container through the diluted gas discharge hole together with the cathode off-gas flowing inside the cathode off-gas discharge path.

* * * * *